Patented Aug. 3, 1954

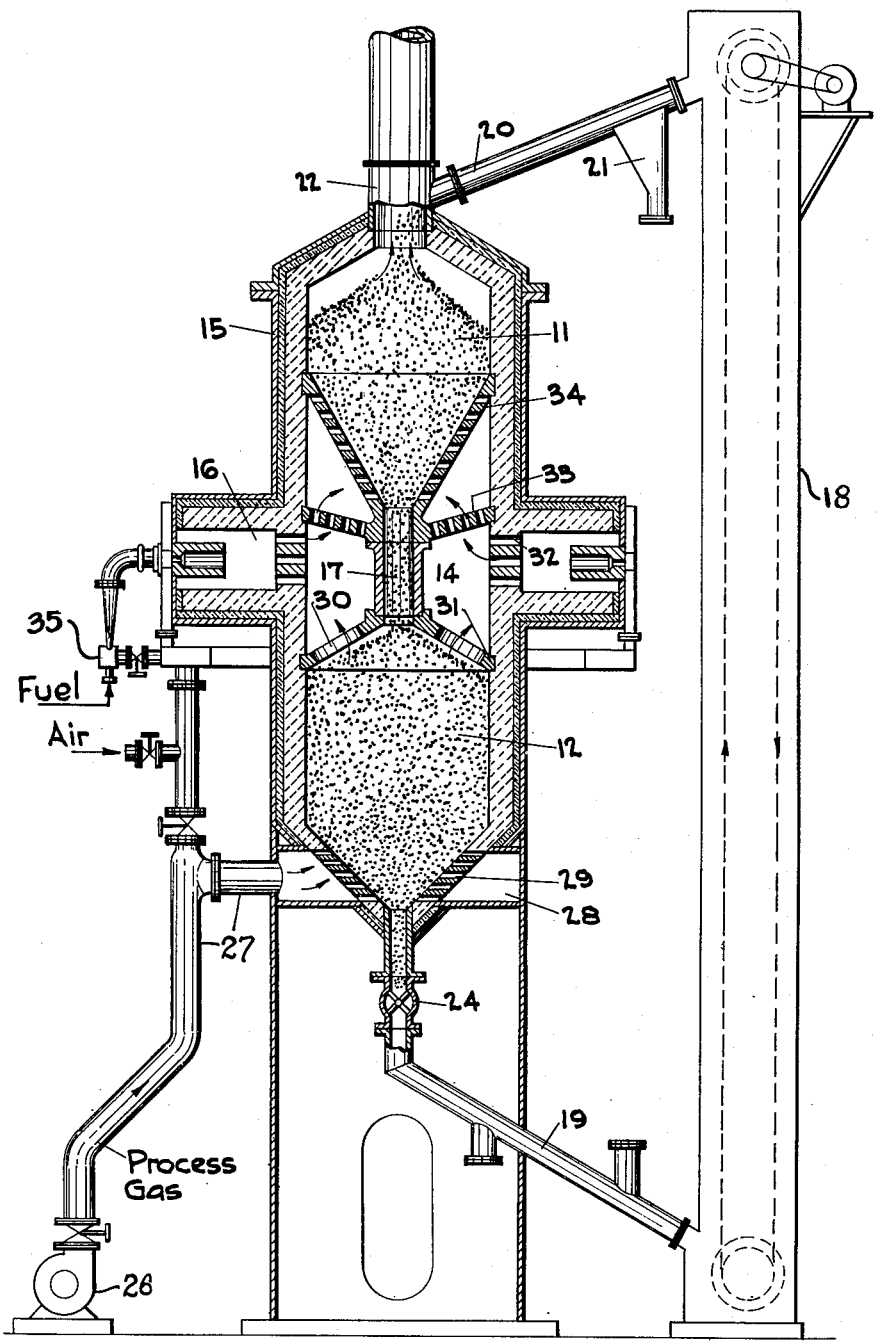
FIG. I

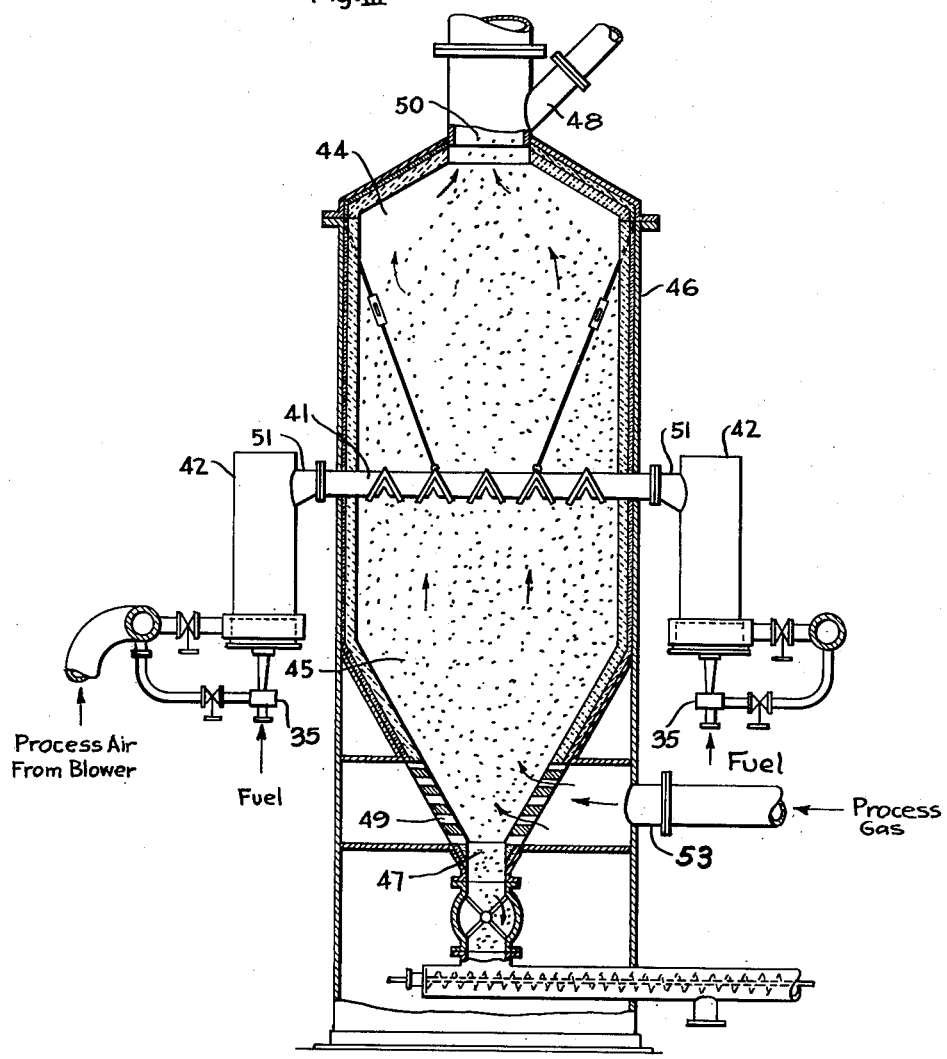

2,685,343

UNITED STATES PATENT OFFICE 2,685,343

METHOD AND APPARATUS FOR DEODORIZING GASES

Karl Permann, Oakland, Calif., assignor to Shell Development Company, Emeryville, Calif., a corporation of Delaware Application May 11, 1951, Serial No. 225,834

7 Claims. (Cl. 183—6)

This invention relates to a method and apparatus for deodorizing gases. More particularly, it pertains to an improved method and apparatus for decontaminating relatively thermally inert contaminated gas containing a noxious combustible gaseous contaminant and containing only a minor proportion of combustible material.

Air contamination by substances which produce obnoxious odors or nauseating effects has become a serious industrial problem. Such contamination is not only health impairing to animals, particularly human beings, but also seriously hampers breathing and the growing of plants, thus lowering the productivity of agriculture. Damaged goods and depreciated properties result in the affected area.

Some industrial plants located in rural areas of large cities have found it profitable to recover air pollutants, while others are destroying them by means of combustion or decomposition at various high temperatures. There are also other methods which deal with air pollution, depending on the character of the pollutants. Various types of equipment are being used in this connection which attempt to alleviate this air contamination problem, such as bag-filters, washers and scrubbers, centrifugal collectors, electric precipitators, and ultrasonic agglomerators.

A considerable portion of the particles recognized as wholly or partially responsible for air contamination are various gases and microscopic-size solids, such as hydrogen sulfide, ammonia, sulfur dioxide, mercaptans, effluents from sewage disposal and sludge acid utilization plants, further filterable fish and vegetable oils, animal skin fibers, and plant pollens, all of which are combustible or destroyable by decomposition at high temperatures. For instance, sulfur dioxide will decompose in the presence of carbon particles at 2000° F. to carbon dioxide and pure sulfur. In every practical case, however, the concentration of these pollutants in the effluent gas or air stream is so low that combustion of these gases or solid particles can only be accomplished by raising the temperature of the total gas stream to substantially above ignition temperature of the particles, hence usually above 1200° F., up to about 2000° F., or higher, depending on the character of these pollutants.

Heating these contaminated gas streams to such high temperatures in order to ignite and maintain combustion of the contaminants would inherently result in a prohibitive high fuel cost if no further use could be made of the heat remaining in the gas stream. In an attempt to recover the heat which would otherwise be lost in the gas stream, installations to this effect are known, for instance, the so-called Royster heat regenerators (see U. S. Reissue Patent 19,757) for the treatment of effluent gases from sewage disposal plants, and the like. These installations consist of two cyclic operating brick-lined and gravel-filled generators, blowers, water-seal gas valves and duct work. The capital cost of these generators which operate in the temperature ranges of 1200° to 1600° F. is high.

A principal object of the present invention is to provide an improved method for the economical and efficient decontamination of relatively thermally inert gases containing only a small proportion of combustible noxious material which is difficult to remove by physical means.

Another object of the invention is to provide an economical method (and apparatus) for the destruction of undesirable contaminants in industrial waste effluent gases.

A still further object of the invention is to provide an improved apparatus adapted for the economical and efficient treatment of a gas stream at a high temperature above about 1200° F., which gas stream contains only a small proportion of material which it is desired to convert to other substances at the elevated temperature.

Another object is to provide an improved method and apparatus adapted for the economical and efficient treatment of a gas stream which requires a high temperature, such as above about 1200° F., for a desired conversion of a portion only or of essentially all of the components of said gas stream, which conversion is one that does not liberate nor absorb a relatively large proportion of heat, that is, it is either essentially isothermic or it is exothermic or endothermic to only a relatively small degree.

These objects, and others which will become apparent, and the method and means of their attainment will be better understood from the description of the invention, which will be made with reference to the accompanying drawing, wherein:

Figure I represents, conventionally and somewhat diagrammatically, a vertical view, partly in elevation and partly in cross-section, of one form of apparatus particularly adapted to the carrying out of the invention, and Figure II represents, conventionally and somewhat diagrammatically, a vertical view, partly elevational and partly in cross-section, of another form of apparatus particularly adapted to the carrying out of the invention.

Figure III is a horizontal projection of the grid distributor shown in Figure II.

Now, in accordance with the present invention, there is provided an improved method and apparatus for effecting a conversion of materials in a gas stream at an elevated temperature, wherein heat liberated by the conversion is insufficient to produce and/or maintain the required conversion temperature. According to a more specific embodiment of the invention, there is provided an improved method and apparatus for decontaminating a contaminated gas containing a noxious combustible gaseous contaminant and containing only a minor proportion of combustible material. According to the method of the invention, a body of refractory pebbles is caused to move by gravity successively downwardly through a pebble heating zone and a pebble cooling zone, while at the same time the contaminated gas is forced upward through said zones in countercurrent contact successively with the pebbles in the pebble cooling zone and with the pebbles in the pebble heating zone. The thus preheated contaminated gas is heated further as it passes from the pebble cooling zone to the pebble heating zone by admixing it with hot combustion gases having a temperature and used in sufficient proportions to ignite or convert the contaminant; and the resulting hot gas admixture of hot combustion gases and decontaminated gas is passed through the pebble heating zone countercurrently to the pebbles therein to heat the pebbles and to cool the combined gas stream. The cooled pebbles which are withdrawn from the lower part of the pebble cooling zone are recirculated, as by means of a suitable elevator, such as bucket-type elevator, to the top part of the pebble heating zone.

It is thus seen that in the practice of the invention, refractory pebbles are caused to flow by gravity downwardly through an overall horizontally-confined treating zone which is maintained with a temperature gradient decreasing from a temperature above the ignition temperature of the contaminated gas in an intermediate zone to both the upper and the lower ends of the treating zone. The gas to be treated is forced through the treating zone countercurrently to the moving pebbles therein, entering the lower section of the treating zone at a suitable low temperature, such as ambient atmospheric temperature and exiting the upper section of the treating zone also at a relatively low temperature, but usually at a temperature appreciably higher than the temperature of the entering contaminated gas stream. Heat for maintaining the temperature of the hot intermediate zone above the ignition temperature of the contaminated gas and for raising the temperature of the preheated contaminated gas is supplied as sensible heat in hot gases, e. g., hot combustion gases, delivered to said intermediate zone.

In order to attain the decontamination of the contaminated gas by the method of this invention, there is provided a continuous gas heating system, of the recirculated heated refractory element type adapted to utilize a moving bed of pebbles, which comprises in combination a first heating chamber (or zone) for heating pebbles by countercurrent flow of the pebbles and of hot gas therethrough, a second chamber (or zone) essentially subjacent said first heating chamber and adapted for preheating a gas and cooling hot pebbles therein by countercurrent flow of the two materials therethrough, communicating means of restricted cross-section between said heating chamber and said second chamber adapted for gravity flow of pebbles therethrough, communicating means between said chambers adapted for flow of gas from the upper part of said second chamber to the lower part of said first heating chamber, gas inlet distributor means adapted for the introduction of hot combustion gas into the lower part of said heating chamber, and a transfer means for returning pebbles from the lower part of said second chamber to the upper part of the heating chamber.

For a more complete understanding of the invention, a more detailed description thereof is given with reference to the accompanying drawing.

Referring to the drawing, Figure I represents a preferred form of apparatus of the prevent invention which is particularly adapted for effecting the decontamination of contaminated gases in accordance with the practice of the invention.

The preferred apparatus shown in Figure I consists essentially of a pebble heater chamber 11, a gas heater chamber 12, an annular gas mixing chamber 14 and a combustion chamber 16; a pebble communicating means between the pebble heater and gas heater chambers, enclosed in an outer shell, suitably lined with highly refractory heat insulating material, which shell is essentially closed except for pebble feed inlet and gas effluent outlet at the upper end thereof, pebble outlet and gas inlet openings at the lower end thereof, and fuel gas and air inlet openings directly into the gas mixing chamber intermediate to the ends of the shell and communicating directly with a combustion chamber 16. Upper and lower chambers 11 and 12 have angular (conical shaped) lower and upper sections, respectively and are connected by means of a throat 17 of reduced cross-section adapted for gravity flow of pebbles from the upper chamber to the lower chamber. The apparatus is provided with a suitable pebble transfer mechanism for transferring pebbles withdrawn from the lower chamber to the upper part of the upper chamber, such as bucket elevator mechanism represented by 18, with required connecting conduits 19 and 20. Conduit 20 is provided with a suitable screen and fines collector or trap as indicated by 21.

In the practice of decontaminating gas containing only a small amount of combustibles by the method of this invention, utilizing the apparatus of Figure I, the heat transferring elements, e. g., balls or pebbles, preferably of ceramic material of sufficient physical strength to withstand the friction and impact to which they are subjected, for example spheres of one-half inch diameter and made of dense, high (70%) alumina-diaspore plastic fire clay, are discharged by chute 20 into a vertical gas exit pipe 22 extending from the top of pebble heater chamber 11. The heating elements entering the pebble heater chamber by gravity are distributed throughout the chamber. The pebbles are permitted to gravitate downwardly through chamber 11, connecting throat 17 and gas heating chamber 12, the movement being controlled by the rotary valve and gas seal 24. The contaminated gas is forced, as by a suitable gas blower 26, through a gas duct 27 to a suitable gas distributing chamber 28 and thence through suitable perforations 29 in the wall of the lower inclined (conical) section of the gas heating chamber, into said chamber. The contaminated gas is forced under suitable pressure differential upwardly through the pebbles in the gas heating chamber 12, whereby the gas is preheated to a temperature near the ignition temperature of the combustibles thereof as they exist in the contaminated gas, and the pebbles are cooled to substantially, within about 100° F., the temperature of the entering contaminated gas. The thus preheated contaminated gas enters the mixing chamber 14, through openings 30 provided in supporting grid 31, wherein it is admixed with hot combustion gases, containing any excess oxygen which may be required by the contaminants, entering through wall openings 32 from attached combustion chamber 16. A sufficient quantity of hot combustion gas raises the temperature of the preheated contaminated gas above the ignition temperature of said contaminated gas with resultant combustion of the combustibles therein, including the contaminants. The resultant hot mixture of combustion gases and remainder of the contaminated gas is then passed through openings provided in supporting and chamber defining wall members 33 and 34, into the lower part of pebble heater chamber 11. The hot gases flow upwardly through the downwardly moving body of pebbles with heat transfer from the hot gases to the pebbles, whereby the pebbles are heated and the effluent gas mixture is suitably cooled.

The apparatus shown in Figure II, and its indicated method of application to the decontamination of contaminated gas containing combustibles of lower ignition temperature are in the essentials similar to the apparatus and method described with reference to Figure I. The principal differences between the two are: (1) in Figure II, the single throat pebble communication between the two chambers of the treating apparatus, as shown in Figure I, has been made into a plurality of transfer openings by means of a grid 41, shown in horizontal projection in Figure III, thus making it possible to utilize a larger proportion of the treater for contacting pebbles with the gas and thereby reducing the overall size thereof, for the same utility, and (2) in Figure II the mixing zone for the preheated contaminated gas and the hot combustion gases is distributed rather uniformly in a horizontal cross-section of the treater, the hot combustion gases being delivered thereto through the grid distributor 41 from the communicating combustion chambers 42. The apparatus of Figure II thus comprises in combination a pebble heater chamber or zone 44, a gas heater chamber or zone 45 and a gas distributing grid 41, adapted for the passage of pebbles therethrough, separating the two zones, enclosed within an upright cylindrical shell 46 having an inverted conical lower section defining the lower part of the gas heater chamber 45. The treater is provided with corresponding pebble feed and outlet openings and transfer means 47 and 48 and process gas feed distributing inlet 53 and distributing means 49 and outlet 50 and with hot combustion gas communicating means 51 for conducting hot combustion gas from combustion chambers 42 to gas distributor 41. Suitable pebble elevating means, gas and air blowers and the like will be understood to be provided, similar to Figure I.

Practice of the invention in apparatus as shown in Figs. I and II consumes only about 10% of the amount of fuel which otherwise would be necessary if no further use of the heat in the effluent gas stream could be found. The operation is continuous without having to reverse the direction of the gas flow and without any cyclic shifting of a high temperature zone inside the heater.

Both of the decontaminating units shown consist essentially of the heater proper, an elevator, and a gas and an air blower. The gas blower is necessary only in cases where the effluent gas which is to be treated has not enough pressure to overcome its flow resistance through the heater. These resistances or pressure drops of the gas flow through the pebble beds are dependent on the mass velocities selected, but normally should not exceed about 0.2 pound per square inch per foot of pebble bed, except when the gas is released at a higher pressure. The mass velocity and pressure drop can be advantageously co-ordinated.

The apparatus as shown in Figure I resembles a pebble type heater except that the gas from the lower pebble chamber enters a mixing chamber where it combines with the fresh combustion gas and reaches its designated temperature. From here the total gas passes through a pebble grid and enters the upper pebble chamber. This apparatus, which is descriptively designated Type H (the apparatus of Figure II is designated Type L), is intended for high temperature operation, or in cases where it would be profitable to divert a portion of the gas stream at this high temperature from the mixing chamber for steam generation. The upper pebble grid of Figure I is a ceramic structure built of segmental sections which can be shaped and machined to correct size before burning.

The apparatus of Figure II is considerably simpler than that of Figure I, inasmuch as an alloy or ceramic clad steel chevron-type gas distribution system is substituted for the ceramic throat and grid elements and the separate mixing chamber of Figure I is omitted. Actually the pebble bed itself above and adjacent to the distributor provides sufficient mixing of the process gas with the fresh combustion gas emitted from this distributor. The result is the same as in the Type H unit, but the heater is about two diameters less in height and otherwise simplified. In cases where alloy steel distributors are used, the maximum temperature at the alloy distributor will usually be limited to about 1800° F. In Figure II, the combustion chambers may consist of two external refractory lined steel cylinders, fitted with burners and secondary air shutters.

The sudden temperature rise of the gas stream near the middle height of the heater or treater is accomplished by the injection of hot combustion gas into the mixing chamber (Type H) or into the pebble bed adjacent the gas distributor (Type L). The hot combustion gas, either with or without a certain amount of excess air, depending on the requirements for the desired conversion, is produced in a separate combustion space which is provided with suitable type burners, 35. The temperature in the combustion space surrounding the mixing chamber (Type H), or attached to the heater by connecting ducts (Type L), can be controlled by admittance of excess fresh air from the same blower supplying the combustion air, through a series of adjustable openings in the windbox near the burners. Due to the outstanding heat economy of the process, the size of the burners is small.

The cold gas stream enters near the bottom of the lower pebble chamber and is heated during its upward passage through the pebble bed to within about 200° F., preferably within about 125° F., of the designated maximum temperature by the heat given off from the hot pebbles in direct contact and heat exchange. The gas stream leaving the lower pebble bed passes through the grill or between the distributor system and is then heated to its maximum temperature by being mixed with fresh combustion products from the burners. After this, on its succeeding upward flow the gas is the hotter medium and about 100–125° F. hotter than the pebbles and thereby provides the flow of heat from the gas to the pebbles. The gas finally leaves the upper pebble bed and chamber at a temperature about 100° F. above that of the incoming pebbles.

Any broken pebbles or fines caused by their flow and abrasive action are eliminated from the stream by a screen in the top chute. Draining and the filling of pebbles is accomplished by suitable means such as spouts attached to the bottom connection. A rotary star feeder at the bottom prevents the gas stream from escaping into the elevator shaft. The top chute does not require such a seal since the gas is normally vented at atmospheric pressure.

The temperature difference between the pebbles and the gas throughout their countercurrent flow is preferably held at about 100° F., that is, the pebble temperature is lower than the gas in the upper bed, and is higher in the lower bed. The temperature gradient through the pebble bed is controlled by the amount of pebbles passing through the chambers, which in turn is a function of the size and speed of the buckets in the elevator. The maximum pebble flow however, is determined by the size of the neck (Type H) through which the pebbles must pass.

The mass velocities of the gas stream through the pebble beds are kept relatively small to keep pressure drop and power requirement as low as is economically possible. These velocities are far below such which may cause lifting or vibration of the pebble bed, so that further precautions in this respect are not necessary.

The specified temperature difference between the pebbles and the gas, the velocities of the gas flow, and the size of the pebbles are such that design and operation of the equipment result in well proportioned heat transfer rates, pressure drops, power consumption, and overall suitable constructional dimensions.

At the final analysis, the amount of heat supplied in the form of fuel which is required for the process is equivalent to the difference in heat capacity between the exiting and entering gas streams including some unavoidable heat losses from the system, minus the heat quantity which may be released by the combustion of the pollutants themselves.

The gas deodorizing and decontaminating apparatus and method described herein in accordance with the present invention are characterized as possessing the following advantageous features:

1. Heating and cooling of a gas stream within one and the same equipment for the purpose of burning odorous substances of small concentrations in a gas or air stream.

2. Wide temperature range and other flexibility in operation, limited only by the heat resistance of materials employed in contact with the gas.

3. Utmost heat efficiency during operation since most of the heat of the heated gas is used again to heat the pebbles.

4. Simplicity of installation and consequent low capital cost as compared to other types of installations for similar operation.

Although the invention has been described in detail as applied to the decontamination of a contaminated gas containing only a relatively small proportion of combustible material, it will be understood that the method and apparatus of the invention are applicable to the treatment of other gaseous streams which require a high temperature for the desired conversion and yet the conversion results in the liberation of not more than a relatively small proportion of heat so that the heat liberated thereby is insufficient alone to raise the temperature of the gas to the temperature required for the conversion. This is true in those cases where the convertible material (material to be converted) is present in a relatively low concentration in a diluent gas which is relatively inert under the circumstances, as well as in those cases where a large proportion or even all of the gas stream is composed of convertible material, but the conversion is essentially an isothermic one, that is, it is isothermic, slightly exothermic or even slightly endothermic. It will be readily understood, also, that the required additional heat can be provided by hot gas streams other than hot combustion gas, such as any suitable highly exothermic reaction product stream, the selection of which will depend on the particular conversion which it is desired to effect. Thus, the reaction of chlorine with various substances, such as with hydrogen, may be utilized to supply the required heat and high temperature.

It is to be understood that the detailed description of the invention, both as to the apparatus and the method practiced when utilizing said apparatus, are to be considered as illustrative of preferred embodiments of the invention, but are not to be considered as limiting the invention thereto. Thus, although the specific furnaces illustrated in Figs. I and II have a generally upright cylindrical shape, it will be readily apparent to those skilled in the art to which the invention pertains that the furnace can be constructed so that transverse sections through the chambers need not be circular, but they may be elliptical, square, rectangular, or any other suitable shape.

The design and construction of a suitable apparatus of the described H-type for a particular utility is illustrated by the following pertinent data and factors for the case where it was desired to heat an air stream at a rate of 10,000 cubic feet per minute from 100° F. to 1800° F. in order to destroy an odorous compound contained therein. For a mass velocity (G) of the gas of 500 lb./sq. ft./min. and selected values (w) of 95 pounds of pebbles per cubic foot, 73.5 square feet of pebble surface (s) per cubic foot of pebbles, a pressure drop (dp) of 0.09 pound per square inch per foot of depth of pebble bed and an overall heat transfer rate (U) of 5.1 B. t. u./sq. ft./hr./° F., it was found that the flow of about 490 cu. ft. of said pebbles per hour through an upper pebble zone with a diameter of about 11.15 feet and a length (height) of about 4.85 feet in combination with a lower pebbles zone with a diameter of about 10.8 feet and a length of about 6.1 feet, makes it possible to heat the gas to a temperature of about 1675° F. at the top of the lower bed, with the pebbles in the throat at a temperature of about 1750° F., and by the use of hot combustion products from about 2450 cu. ft. per hour of natural gas, to heat the gas further to 1800° F. in the upper pebble zone. The pebbles are removed from the bottom of the lower chamber at about 200° F. and fed to the upper bed via an elevator at about 190° F. The effluent gas stream from the upper pebble bed is about 375° F.

For the same purpose, but when it is desired to treat the gas at a greater mass velocity, the conditions are altered accordingly. For example, for a mass velocity of the gas of $G=1500$ and correspondingly selected values of $w=86$, $s=64.5$, $dp=0.70$ and $U=11.2$, a pebble flow rate of about 490 cubic feet per hour through an upper zone having a diameter of about 6.4 feet and a height of about 7.3 feet in combination with a lower zone having a diameter of about 6.25 feet and a height of about 9.4 feet is satisfactory.

As illustrative of the use of a converter of the described L-type, it was desired to decontaminate a gas vent stream from a modified Claus sulfur plant. The rate of production of the vent gas was about 3,200 standard cubic feet per minute and had the following approximate composition: $H_2S$—0.82%, $SO_2$—2.56%, $CO_2$—5.47%, $N_2$—68.80%, $H_2O$—38.35%. For a mass velocity of the gas of $G=750$ lb./sq. ft./min. and selected values of $w=93$, $s=71.5$, $dp=0.19$ and $U=7.4$, suitable heating of the vent gas from 300° F. to 1400° F. is effected by the flow of about 175 cubic feet per hour of the pebbles through an upper zone of about 5.15 feet diameter and 4 feet height and a lower zone of about 4.5 feet diameter and 5.15 feet height, the heat being supplied by hot combustion products from the burning of about 1,110 cubic feet of natural gas per hour with about 85% excess air, the excess air to provide oxygen required for combustion of the $H_2S$ in the contaminated incoming gas.

I claim as my invention:

1. A continuous method of decontaminating a substantially thermally inert contaminated gas containing a minor proportion of noxious combustible gaseous contaminant, which method comprises: continuously moving a body of refractory pebbles successively downwardly through a pebble heating zone, immediately thereafter through a contaminated gas preheating and pebble cooling zone and upwardly through an elevating zone back to the top of the pebble heating zone; at the same time countercurrently contacting the pebbles and the contaminated gas successively, and without any intervening cooling contact of the pebbles with any other fluid stream, in the pebble cooling and pebble heating zones; and simultaneously countercurrently contacting the pebbles in the pebble heating zone with hot combustion gases having a temperature upon initial contact with the pebbles above the ignition temperature of said contaminants as in said contaminated gas.

2. A continuous method of decontaminating a contaminated gas containing a noxious combustible gaseous contaminant and containing a minor proportion of combustible material insufficient to maintain normal self-sustained combustion when admixed with air, which method comprises: continuously moving a body of refractory pebbles successively downwardly through a pebble heating zone, immediately thereafter through a pebble cooling and contaminated gas preheating zone and upwardly through an elevating zone back to the top of the pebble heating zone; at the same time countercurrently contacting the pebbles in the pebble cooling zone with the contaminated gas; admixing the thus preheated contaminated gas with hot combustion gases at a temperature and in proportions sufficient to ignite said contaminant; immediately countercurrently contacting the pebbles in the pebble heating zone with the resultant mixture of combustion gases and ignited contaminated gas and immediately passing the resulting heated pebbles to the pebble cooling and contaminated gas preheating zone.

3. A continuous method of decontaminating a substantially thermally inert contaminated gas containing a noxious combustible gaseous contaminant and containing a minor proportion of combustible material insufficient to support self-sustained combustion when admixed with air, which method comprises: countercurrently contacting and preheating said contaminated gas in a gas preheating zone with a downwardly moving body of heated refractory pebbles to raise the temperature of the contaminated gas below but to within at least about 200° F. of the ignition temperature of said contaminant as in said contaminated gas; admixing the preheated contaminated gas with hot combustion gases at a temperature and in proportions sufficient to ignite said contaminant; countercurrently contacting in a pebble heating zone the resultant mixture of combustion gases and contaminated gas with a downwardly moving body of refractory pebbles circulated from the lower end of said gas preheating zone; and utilizing the thus heated pebbles immediately in the gas preheating zone and without any intervening cooling contact thereof with any other fluid stream.

4. A continuous method of thermally treating a substantially thermally inert gas which exhibits a relatively low conversion exothermicity at an elevated temperature, which method comprises: continuously moving a body of refractory pebbles successively downwardly through a pebble heating zone, immediately thereafter through a gas preheating and pebble cooling zone and upwardly through an elevating zone back to the top of the pebble heating zone; countercurrently contacting the pebbles and the gas successively, and without any intervening cooling contact of the pebbles with any other fluid stream, in the pebble cooling and pebble heating zones; and simultaneously countercurrently contacting the pebbles in the pebble heating zone with hot gases having a temperature upon initial contact with the pebbles above the temperature of rapid conversion of the gas.

5. A continuous gas heating system of the recirculated heated refractory element type adapted to utilize a moving bed of pebbles, which comprises in combination: (1) a heating chamber for heating pebbles by countercurrent flow of the pebbles and of hot gas therethrough and containing gas outlet means and pebble inlet means in the upper part thereof; (2) a second chamber subjacent and communicating directly with the heating chamber and adapted for preheating a gas and cooling hot pebbles therein by countercurrent flow therethrough and containing gas inlet and distributing means and pebble outlet means in the lower part thereof; (3) communicating means of substantially uniformly restricted cross-section between said heating chamber and said second chamber adapted for gravity flow of pebbles therethrough; (4) communicating means between said chambers adapted for flow of gas from the upper part of said second chamber to the lower part of said heating chamber; (5) gas inlet distributor means adapted for the introduction of hot combustion gas into the lower part of said heating chamber; and (6) a transfer means for returning pebbles from the lower part of said second chamber to the upper part of the heating chamber.

6. A gas treating apparatus of the recirculated heated refractory element type adapted to utilize a moving bed of pebbles, which comprises in combination: an upright cylindrical pebble heater chamber having an inverted conical lower section, a subjacent upright cylindrical gas heater chamber having an inverted conical lower section and a conical upper section, a throat communicating means of substantially uniformly reduced cross-section joining the lower section of the pebble heater chamber directly to the upper section of the gas heater chamber, a cylindrical outer shell enclosing said heater chambers, an annular gas mixing chamber defined by the walls of the lower section of the pebble heater chamber, of the throat communicating means, of the upper section of the gas heater chamber and of an intermediate section of the outer shell, with the wall of the lower section of the pebble heater, the wall of the upper section of the gas heater and the wall of the intermediate section of the outer shell forming walls of the gas mixing chamber, each being provided with openings therein adapted for the passage of gas therethrough, a combustion chamber connected to and with said gas mixing chamber, gas distributing and inlet means and pebble outlet means provided in the lower section of the gas heater chamber, and pebble inlet opening and gas effluent opening being provided in the upper section of the pebble heater chamber, and a transfer means for returning pebbles from the pebble outlet in the gas heater chamber to the pebble inlet of the pebble heater chamber.

7. A gas treating apparatus of the recirculated heated refractory element type adapted to utilize a moving bed of pebbles, which comprises in combination: an upright cylindrical pebble heater chamber, a contiguous subjacent upright cylindrical gas heater chamber, a cylindrical outer shell enclosing said heater chambers in a unitary apparatus, a grid partition and gas distributor having a substantially uniformly restricted cross-section free area between and separating said heater chambers and adapted to provide a plurality of substantially uniformly spaced pebble transfer openings across substantially the full diameter of said heater chambers adapted for the transfer of pebbles from the pebble heater chamber to the gas heater chamber and for simultaneous gas flow from the gas heater chamber to the pebble heater chamber and adapted to distribute a gas uniformly to the full horizontal cross-section of the lower section of the pebble heater chamber, a combustion chamber connected to said grid partition and gas distributor, gas distributing and inlet means and pebble outlet means provided in the lower section of the gas heater chamber and pebble inlet opening and gas effluent opening being provided in the upper section of the pebble heater chamber, and a transfer means for returning pebbles from the pebble outlet in the gas heater chamber to the pebble inlet of the pebble heater chamber.

References Cited in the file of this patent

UNITED STATES PATENTS

| Number | Name | Date |
| --- | --- | --- |
| 1,904,153 | Lucke | Apr. 18, 1933 |
| 2,399,450 | Ramseyer | Apr. 30, 1946 |
| 2,528,553 | Royster | Nov. 7, 1950 |
| 2,530,274 | Weber | Nov. 14, 1950 |
| 2,533,142 | Royster | Dec. 5, 1950 |
| 2,555,210 | Waddill et al. | May 29, 1951 |
| 2,577,655 | Grossman et al. | Dec. 4, 1951 |
| 2,595,574 | Grossman | May 6, 1952 |